RECORDER

Filed Sept. 3, 1953 3 Sheets-Sheet 1

INVENTOR.
Howard S. Gleason
BY
Francis E. Blake
Att'y

INVENTOR.
Howard S. Gleason
BY
Francis E. Blake
Att'y

RECORDER

Filed Sept. 3, 1953

3 Sheets-Sheet 3

INVENTOR.
Howard S. Gleason

BY Francis E. Blake

Att'y

United States Patent Office 2,867,435

Patented Jan. 6, 1959

2,867,435

RECORDER

Howard S. Gleason, Rochester, N. Y., assignor, by mesne assignments, to General Dynamics Corporation, a corporation of Delaware Application September 3, 1953, Serial No. 378,209

21 Claims. (Cl. 271—2.1)

The present invention relates to magnetic recorders and particularly to tape recorders adapted for use in connection with automatic toll ticketing in telephony.

One of the primary objects of the present invention is to provide a new and improved magnetic recorder and particularly a magnetic tape recorder.

A further object of the present invention is to provide a new and improved multi-channel magnetic recorder utilizing an endless recording medium, such as an endless tape.

A further object of the present invention is to provide a new and improved magnetic recorder in which the record medium, such as tape, is moved intermittently during the recording operation and continuously, and preferably at a higher speed, during the reproduce or playback operation.

A further object of the present invention is to provide a new and improved magnetic recorder characterized by a novel drive for moving the record medium in one direction in a step-by-step manner.

A further object of the present invention is to provide a new and improved magnetic recorder provided with a selectively operable driving means for moving the tape at high speed in one direction.

A still further object of the present invention is to provide a new and improved magnetic recorder having two types of tape drive, one of which is adapted to move the tape in a step-by-step manner and the other of which is adapted to move the tape in the same direction but continuously and preferably at higher speed.

Another object of the present invention is to provide a magnetic recorder of the character set forth in the preceding paragraph and provided with interlocking means associating the two types of drives so that both drives cannot be rendered effective simultaneously.

Another object of the present invention is to provide a new and improved multiple magnetic recorder unit and one that is characterized particularly by novel means for selectively driving one or more of the units.

A further object of the present invention is to provide a new and improved tape recorder magazine and further a magazine having what might be characterized as a built-in pinch roller for holding the tape against a driving capstan.

A still further object of the present invention is the provision of a new and improved tape recorder magazine having a built-in pinch roller and having associated therewith spring bias means for holding the magazine in operative position and the built-in pinch roller against a cooperating capstan.

Other objects and advantages of the present invention will become apparent from the ensuing description of an illustrative embodiment thereof, in the course of which reference is had to the accompanying drawings, in which.

Figure 1:
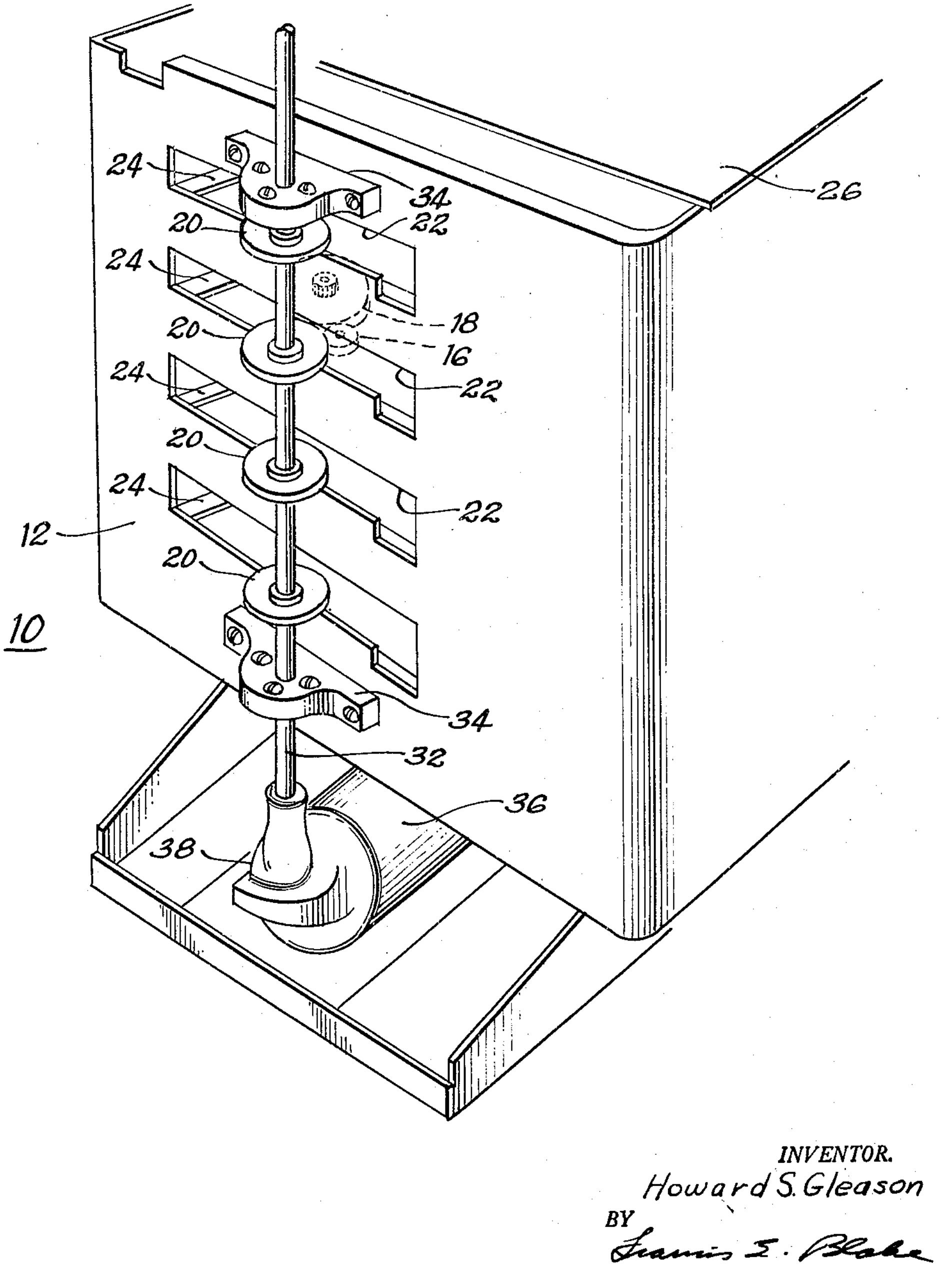
Fig. 1 is a fragmentary perspective view of a multiple recorder unit illustrating particularly a portion of the driving means whereby one or more of the tape recorders may be selectively driven.

Reference will first be had to Fig. 1 which illustrates a multiple unit tape recorder assembly indicated as a whole by reference character 10. It comprises a housing 12 in which may be mounted a plurality of magnetic recorders, such as a recorder 15 illustrated in greater detail in Fig. 2. The various recorders 15 have not been illustrated in Fig. 1 although a clutching idler 16 and a capstan drive wheel 18 forming part of one of the recorder unuits have been illustrated in phantom to indicate the cooperative relation between these elements and one of a number of continuously rotating drive wheels 20 rotatably mounted on the housing 12. Each of the drive wheels 20 is positioned adjacent an associated aperture 22 providing access to the interior of the housing and enabling the driving and driven wheels selectively to be brought into cooperative driving relation. The individual magnetic recorders 15 are adapted slidably to be mounted within the housing 12, as upon guide ways 24 mounted on opposite sides of the housing, although but a single guide way for each recorder is shown. If desired, the housing may be closed in whole or in part by a cover 26.

In accordance with one of the features of the present invention, the drive wheels 20 are driven at constant speed, and continuously, so that when a clutching idler 16 is moved to interconnect a drive wheel and a capstan drive wheel 18, the tape recorder is operated continuously to drive the tape, indicated by a reference character 30 (Fig. 2), for as long as the clutching idler engages the driving and driven wheels.

The drive wheels 20 are mounted in vertical spaced relation upon a shaft 32 journaled in vertically spaced apart bearing supports 34. The shaft is continuously driven at constant speed by a synchronous motor 36 connected to the shaft through gearing in a housing 38.

Before describing in detail the construction and operation of the recorder, it may be well to review briefly the the general construction and operation. In general, the recorder 15 is of the magnetic type and includes an endless recording medium which may be the previously referred to tape 30 having a magnetic coating. The recorder 15 comprises two main parts, these being a magazine 40 ( see particularly Figs. 2 and 7), in which a considerable length of the tape 30 is stored in random layer fashion, and a base plate 42 upon which are mounted the magazine 40, various recording and reproducing means, tape sensing contact devices, and selectively operable tape driving means whereby the tape can be driven intermittently or step-by-step in one direction during recording operations and continuously in the same direction for various lengths of tape, during reproducing or playback operations.

A detailed description of one of the recorders 15 will now be given in connection with Figs. 2 to 8 and particularly Fig. 2. As heretofore indicated, the recording medium is the tape 30 and it is preferably formed as an endless loop. The major portion of the tape is located within the magazine 40 which may be constructed of transparent plastic material enabling the length of tape within the magazine readily to be observed. While Fig. 2 illustrates comparatively few layers of tape within the magazine, in actual practice the magazine is quite full and thus enables a considerably length of tape to be used.

Insertion and removal of the recorder 15 relative to the housing 12 is facilitated by providing the base plate 42 with a short upstanding vertical flange 44 at its front end. The recorder unit may be properly located and held in the housing by locking springs 46 located at opposite sides of the base plate 42. These springs may have latching elements 48 in the form of upwardly extending projections associated with complementary means (not shown) in the housing 12 to lock the recorder 15 in place and adapted to be unlocked upon depression of the front ends 50 of the locking springs 46.

As indicated, the various operating parts of the recorder 15 are mounted upon the base plate 42. These include the magazine 40, which is detachably mounted upon the plate; a pair of transversely (relative to the length of tape) aligned record-reproduce transducing means 52 and 54 constituting the hereinafter named mark and space heads, respectively; a transducing means 56 constituting an erase head which is spaced from the other heads; the movable clutching idler 16 and its associated capstan drive wheel 18; means for intermittently driving a capstan 62 which may take the form of a stepping magnet 58 and an associated pawl 60 for rotating the capstan 62 through a short increment of angular movement each time the stepping magnet 58 is energized; and a clutch magnet 64 for controlling the clutching idler 16 to effect rotation of the drive wheel 18 and the connected capstan 62 for continuously driving the tape 30 at high speed.

Figure 2:
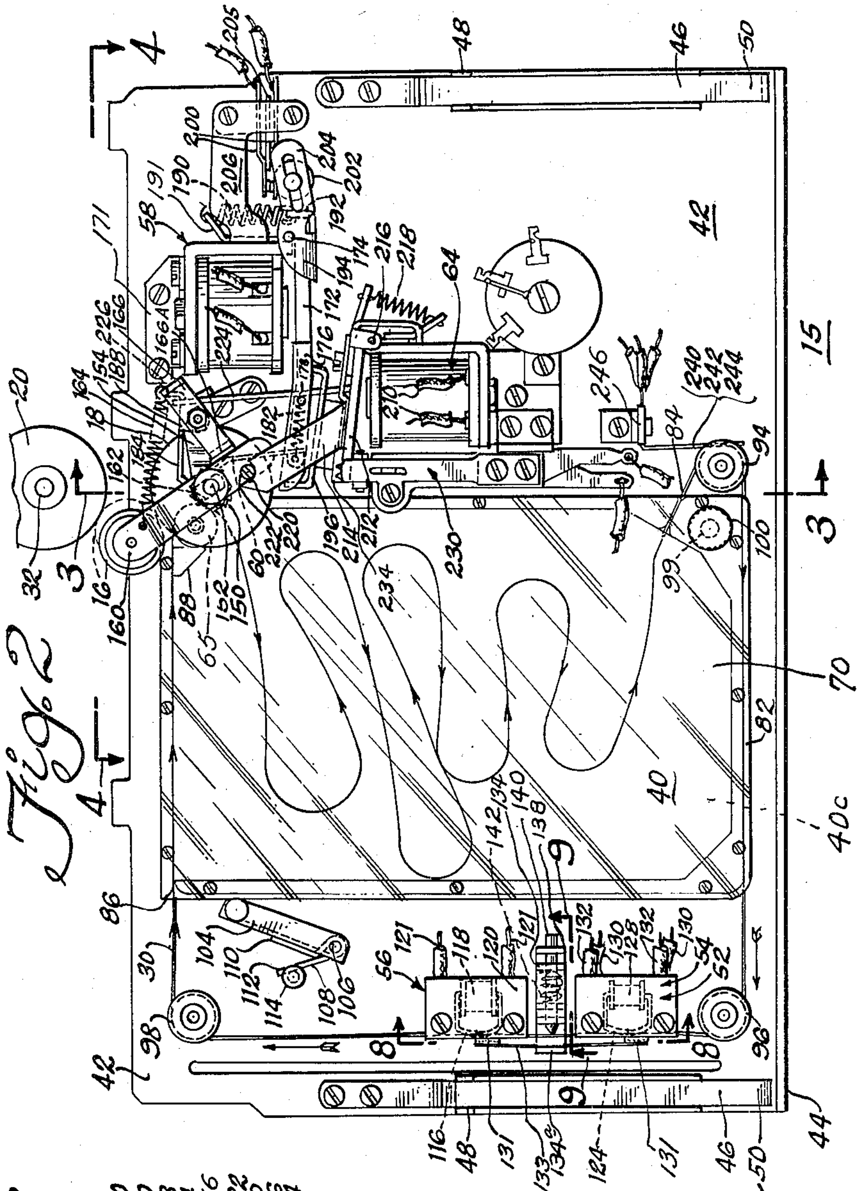
Fig. 2 is a top plan view of one of the tape recorders of the present invention.
Figures 4, 5, 6, 7, 8, 9:
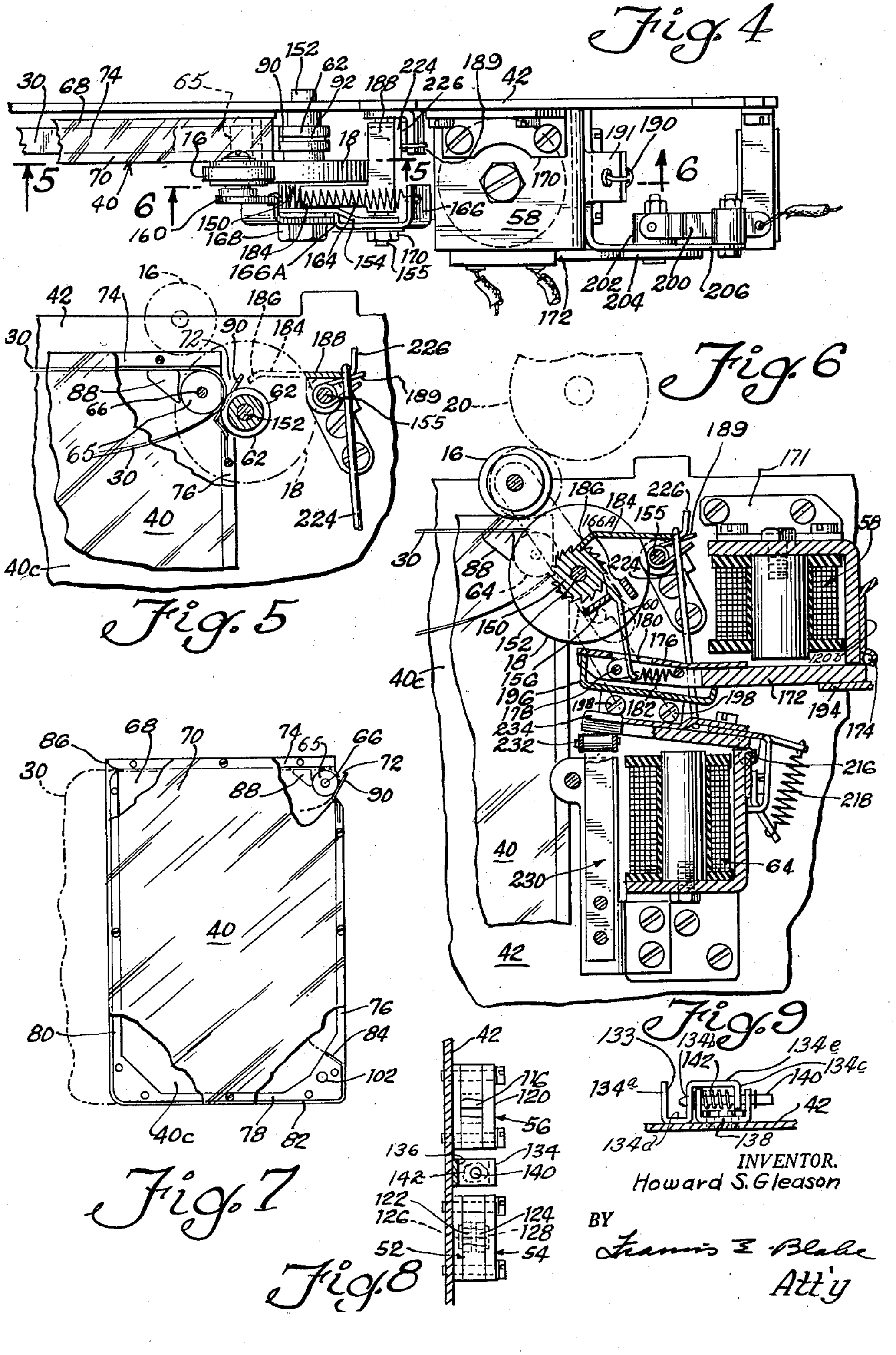
Fig. 4 is an enlarged fragmentary side elevational view taken along 4—4 of Fig. 2.
Fig. 5 is a fragmentary cross-sectional view taken along the line 5—5 of Fig. 4.
Fig. 6 is a fragmentary cross-sectional view taken along the line 6—6 of Fig. 4.
Fig. 7 is a plan view of the magazine, the covering structure of which is partly broken away better to illustrate details of construction thereof.
Fig. 8 is a cross-sectional view taken along the line 8—8 of Fig. 2 and illustrating details of construction of the magnetic transducers.
Fig. 9 is a fragmentary cross sectional view taken along line 9—9 of Fig. 2.

The magazine 40 is provided with a chamber 40*c*, see particularly Figs. 2 and 7, in which a considerable quantity of the tape is stored in random layer fashion. The magazine is also provided with what may be termed a pinch roller 65, for holding the tape against the capstan 62 so that, when the latter is driven either intermittently or continuously, the tape 30 is driven accordingly. The pinch roller 65 is located at the upper right hand corner of the magazine 40, as viewed in Figs. 2 and 7, and rotatably mounted upon a shaft 66 secured between a rear wall 68 and a front wall 70 of the magazine 40. The magazine is further provided with an opening at the region 72 at the upper right hand corner (Figs. 5 and 7) to enable the pinch roller 65 to come into contact with the capstan 62. In addition to the rear and front walls, the mazagine 40 includes a number of side frame members, these being a top member 74, a right side member 76, a lower side member 78, and a left side member 80. The wall members 68 and 70 overhang the lower side member 78 to provide a channel 82 (see Fig. 7) for the tape 30 at the lower side of the magazine 40. The frame members 76 and 78 are spaced apart slightly to provide an exit 84 for the tape. Likewise, adjacent end portions of the frame members 74 and 80 are spaced apart and also slightly curved to provide an inlet or entrance 86 for the tape 30.

In order to assist in guiding and holding the tape 30 in proper position, there is provided a generally triangular guide block 88 inside of the magazine cavity and in cooperative relation to the pinch roller 65. There is also provided a small diameter resilient guiding finger 90 secured to the side frame member 76 and extending upwardly and biased to engage the pinch roller 65. The capstan 62 is provided with a groove 92 in which the finger 90 rides (see Fig. 4).

A portion of the tape 30 is located outside of the magazine 40 so that it can be brought into cooperative relation with the various transducer heads 52, 54 and 56. The tape 30 leaves the magazine 40 through the exit passageway 84 at the lower right hand corner of the magazine. It thereafter goes around a tape guide roller 94 rotatably mounted on the base plate 42 and thence to the left through the channel 82 to another tape guide roller 96 mounted on the base plate. From the latter, the tape goes past the transducers 52, 54 and 56 to a third tape guide roller 98 and thence back into the magazine through the entrance 86.

The magazine 40 is movably mounted on the base 42 and, in accordance with another of the features of the present invention, it is biased for movement in a clockwise direction about the lower right hand corner in order resiliently to hold the pinch roller 65 against the capstan 62. The movable mounting is pivotal in nature and is provided by a detachable shaft 99 which is rotatably mounted within a transverse opening 102 in the magazine 40 and which is threaded into the base 42. The shaft 99 is also provided with a knob 100 (Fig. 2). The upper left hand corner of the magazine is resiliently biased toward the capstan by a biasing arm 104 (see Fig. 2) pivotally mounted on a pin 106 and forced in a clockwise direction by a spring 108 having an intermediate portion coiled around the pen 106, one end portion 110 bearing against the arm 104, and another end portion 112 bearing against a fixed pin 114 mounted on the base plate 42.

In its passage from the exit 84 to the inlet 86 of the magazine 40, the tape 30 is selectively acted upon by the record-reproduce and erase transducer means. The erase means 56 comprises a single magnetic core 116 (Fig. 2) and an associated winding 118 mounted as in a plastic molded housing 120. The core 116, as best illustrated in Fig. 8, extends across the full width of the tape 30 so that the tape is erased across substantially its entire width if desired, and as in the present case, the coil 118 may be supplied with direct current thereby to provide a direct current erase which effectively saturates the tape, the winding 118 being supplied with current through a pair of conductors 121.

As heretofore indicated, there are two record-reproduce transducer means. These are indicated by the reference characters 52 and 54 and they are located, as best illustrated in Fig. 8, in transversely aligned relationship so that each acts on substantially one half of the tape 30.

The record-reproduce heads 52 and 54 include magnetic cores 122 and 124, respectively. The cores have associated therewith a pair of windings 126 and 128, also respectively, which coils are selectively supplied with signals during recording and are used as reproducer or pick-up coils during playback. The coil 126 is connected to a pair of conductors 130, while the coil 128 is connected to a pair of conductors 132.

The tape 30 is held against the transducer heads 52 and 54 by a pair of pressure pads 131 mounted on a pair of spring arms 133 extending in opposite directions from a movable supporting bracket, indicated generally as 134. The bracket 134 (Fig. 9) is generally S-shaped and includes three parallel legs 134*a*, 134*b*, and 134*c* joined by a pair of connecting portions 134*d* and 134*e*. The spring arms 133 are connected to the leg 134*a*, and the connecting portion 134*d* slidingly engages the base plate 42. The bracket 134 is slidably mounted on the base plate 42 by a U-shaped bracket 138 which is secured to the base plate and which supports a pin or post 140 in its upturned arms. The legs 134*d* and 134*c* are provided with openings in which the pin 140 is slidably mounted so that a compression spring 142 interposed between one of the arms of the bracket 138 and the leg 134*c* serves to bias the pressure pads 131 toward the heads 52, 54, and 56, thereby to urge the tape 30 into intimate engagement with these heads.

In accordance with another feature of the present invention, the capstan 62 is adapted selectively to be driven either intermittently or continuously. It is driven intermittently during the recording operation and continuously during playback, the continuous drive being effective to move the tape for certain lengths as determined by certain controls forming no part of the present invention but which controls are fully described in connection with an automatic toll-ticketing telephone system utilizing the present tape recorder disclosed and claimed in the application of Frank A. Morris et al., Serial No. 348,202, filed April 13, 1953. The capstan 62 forms part of what may be termed a capstan assembly including the capstan itself, the drive wheel 18, and a ratchet gear 150 which is adapted to be moved stepwise by the pawl 60 previously referred to. The assembly is rotatably mounted upon a stationary shaft 152 suitably fixedly secured to the base plate 42. The shaft 152 is connected by a bracket 154 to a second shaft 155, which is also secured to the base plate 42 and which supports certain structures which will be described hereinafter. The bracket 154 is provided with an offset stop defining portion 156 (Figs. 3 and 6) forming a stationary stop or guide for the pawl 60.

The clutch idler 16 is supported from the shaft 152 for angular as well as radial movement relative to the drive wheel 18. The arrangement is such that the idler is normally out of contact with both the drive wheel 20 and the driven wheel 18, as indicated in solid lines in Fig. 2. When the continuous drive is rendered effective the idler is moved both angularly and radially in order to engage both the driving and driven wheels 20 and 18, as indicated in dotted lines in Fig. 2. The idler 16 is rotatably mounted on a mounting lever 160, which in turn is supported by the shaft 152 for angular and radial movement, this movement being provided by a slot 162 formed intermediate the ends of the lever as best illustrated in Fig. 2. The idler mounting lever 160 is biased in a clockwise direction by a spring 164 which is connected between the idler supporting end of the lever 160 and a generally U-shaped support 166 adjustably mounted on the shaft 155. The various elements mounted on the shafts 152 and 155 may be held thereon in suitable manner as by the securing nuts 168 and 170, respectively.

The intermittent drive of the tape 30 and the capstan 62 is effected by the stepping or advance magnet 58 which is adapted to be energized periodically in response to input signals supplied from an external source. This magnet is secured to the base plate 42 by a generally right angle mounting bracket 171 and includes an armature 172 pivotally movable about an axis determined by a hinge pin 174. At its free or forward end, the armature 172 has an extension 176 which is generally of U-shaped section, as will be apparent from a comparison of Figs. 2, 3 and 6. The capstan assembly actuating pawl 60 is pivotally mounted on the extension 176 and preferably upon a pin 178 mounted on and extending between the side walls of extension 176, the bight portion of extension 176 being provided with an aperture 180, see Fig. 6, through which the pawl 60 extends. The pawl is biased for movement in a counterclockwise direction around the pin 178 by a spring 182 attached to the lower end of the pawl and to the armature, whereby the pawl is held against the stop 156 in the retracted position of the armature and is moved into engagement with the teeth of the ratchet when the armature 172 is moved upwardly by the magnet 58. The preferred adjustment of the mechanism provides that the pawl 60 will clear the ratchet 150 at all times when the pawl 60 is in the retracted position shown. The arrangement is such that each operation of the armature 172 upon energization of the advance magnet 58 moves the capstan assembly the distance of one ratchet tooth.

The operation of the capstan assembly by the stepping magnet or advance magnet 58 is very rapid and as indicated, each time the magnet is energized the armature 172 is operated to move the pawl 60 a distance such as to move the capstan assembly the angular distance of one ratchet tooth. The movement is very fast and short and the arrangement is such that the signals to be recorded are supplied and recorded while the tape 30 is stationary. Overshooting of the ratchet wheel 150 and the capstan 62 is prevented by the pawl 60 itself which, when moved upwardly upon energization of the magnet 58, is also forced toward and into movement preventing engagement with ratchet wheel 150 by a left and bent end 166–A (Figs. 4 and 6) of the U-shaped support 166 against which the pawl 60 strikes as it moves up. Reverse movement of the ratchet wheel 150 and of the capstan 62 is prevented by a stop pawl 184, see particularly Fig. 6, having its free end 186 bearing against the ratchet teeth. The stop pawl 184 is mounted on the supporting shaft 155 by an integrally formed and generally U-shaped end portion 188 through the legs of which the shaft 155 extends. The stop pawl 184 is biased into engagement with the ratchet teeth by a small spring 189 encircling the shaft 155.

The advance magnet armature 172 is biased to its retracted position by a spring 190, the lower end of which is connected to an upturned projection 192, preferably formed integral with a rearwardly projecting extension 194 secured as by welding to the armature 172. The upper end of the spring 190 is connected to a lug 191 on a contact support 206 which is carried on the advance magnet 58. The retracted position of the armature is determined by a stationary stop 196 secured by a pair of screws 198, see Fig. 6, to the base plate 42.

In operation, the advance magnet 58 is energized only briefly and, in operating, it opens a pair of interrupter contact springs 200 which are normally closed, as illustrated in Fig. 2. The opening is under the control of a cylinder 202 of insulating material adjustably secured to a slotted rear portion 204 of extension 194. The springs 200 are mounted on the contact support 206. When the armature 172 is displaced, the cylinder 202 moves downwardly to permit the flexed springs 200 to also move downwardly in contact with each other. When the uppermost spring engages a stop 205 carried on the support 206, the springs 200 separate and thus open the circuit therebetween. The springs 200 are particularly useful in providing self-interruption of the energizing circuit for the magnet 58.

When it is desired to reproduce or playback the record, the clutch magnet 64 is energized through a pair of associated conductors 210. When energized, it attracts an armature 212 to render effective the continuous drive. The continuous drive is rendered effective through movement of a control lever 214 fixedly connected to and moving with the armature 212, the armature pivoting about a hinge pin 216 and being biased to retracted position by a spring 218. As the control lever 214 moves down, it moves downwardly a latching portion 220 at its upper end cooperatively associated with a pin 222 on the lever 160, and when the latching portion moves down it permits movement of the idler clutch supporting lever 160 in both a downwardly and clockwise direction under the influence of its biasing spring 164. As the lever 160 is so moved, the clutching idler 16 operatively connects the drive wheel 20 to the driven wheel 18 of the capstan assembly thereby to rotate the capstan assembly continuously and preferably at a high and constant speed. When the armature 212 is moved back up by its biasing spring 218, the latching portion 220 cams the lever 160 back to the position in which it is indicated in Fig. 2.

In order to enable the tape to be driven freely and without interference from the stop pawl 184, the latter is rendered ineffective whenever the clutch magnet 64 is energized. It is rendered ineffective through a connection 224 which may take the form of a relatively stiff wire connecting the armature 212 to a lug 226 formed integral with a back edge of the stop pawl 184, as best illustrated in Fig. 6. It is apparent, therefore, that as the armature 212 is moved downwardly upon energization of the clutch magnet 64, the connection 224 moves downwardly to lift the forward end 186 of the stop pawl 184 from contact with the ratchet wheel 150 so that the capstan assembly can be rotated freely by the drive wheel 20 and the clutch idler 16.

Figure 3:
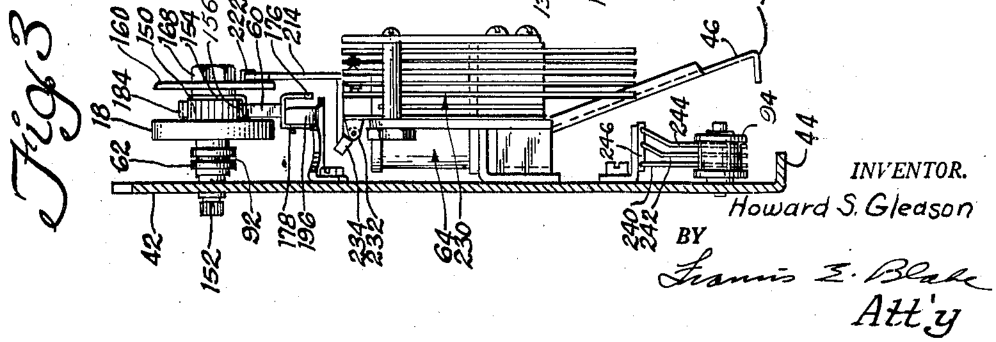
Fig. 3 is a fragmentary cross-sectional view taken along the line 3—3 of Fig. 2.

In accordance with a further feature of the present invention, means are provided to prevent energization of the stepping or advance magnet 58 when the clutch magnet 64 is energized. This is accomplished by placing in series circuit relationship with the stepping magnet 58, a switch 230 which is normally closed and which is adapted to be opened when the armature 212 is operated by the clutch magnet 64. The switch 230 includes a number of spring contact arms (not numbered), some of which are movable upon movement of a switch actuating element 232 (see particularly Fig. 3) which is adapted to be moved to the right as shown in Fig. 3 by a cam defining front portion 234 formed integral with and at the front end of the armature 212 (see also Fig. 6).

From the foregoing detailed description it is apparent that the tape 30, which is endless in construction, may be readily moved as desired either intermittently or continuously. It is preferred that it be moved intermittently for recording and continuously for playback. Specifically, the tape 30 may be moved intermittently only when signals are to be recorded, and it is preferred also that the signals be recorded when the tape 30 is stationary. Also, the continuous drive is preferrably quite rapid so that the playback can be effected in a short period of time. If desired, and as indicated in the above referred to copending application, the tape may be provided with suitable contacts or conductive portions providing certain control operations. The contacts on the tape are adapted to be sensed, so to speak, by a plurality of flexible wires 240, 242, and 244, see Fig. 3, which are mounted on a support 246 so as to bear against the tape 30 in the vicinity of the guide roller 94. The contacts on the tape 30 may be in the nature of foil contacts or some suitable conductive material incorporated in the tape.

By way of review of the operation, it may be noted that the magazine 40 with the tape 30 therein and in an external loop is readily placed in position upon the base plate 42 where it is held on pivotally movable relation by the shaft 99. In this position, the arm 104 and the spring 108 bias the pinch roller 65 carried on the magazine 40 toward the capstan 62 with an intermediate portion of the tape 30 disposed therebetween.

When it is desired to record, the advance magnet 58 is energized intermittently so that the operating pawl 60 moves the ratchet wheel 150, and thus the capstan 62, intermittently and through short distances for each energization of the magnet. As the tape is moved from the exit 84 to the entrance 86 of the magazine 40, it goes past the transducer means 52, 54, and 56, and the signals impressed upon the coils 126 and 128 of the record-reproducer transducer means 52 and 54 are magnetically recorded on the tape. Generally, the erase transducer means 56 is not energized during the record operation.

When it is desired to reproduce the records on the tape 30, the clutch magnet 64 is energized. It operates its armature 212, thereby to bring the clutch idler 16 into position to connect the drive wheel 20 to the capstan assembly drive wheel 18 so that the latter is rotated continuously at a constant and relatively high speed. At the same time, the stop pawl 184 is moved out of operative position and the switch 230 is operated to prevent simultaneous energization of the advance magnet 58. The transducers 52 and 54 now act as pickup or reproduce devices, and after reproduction the record on the tape 30 may be erased by energization of the erase coil 118 which may be supplied with direct current of suitable polarity and of a sufficiently high value to saturate the tape. Also, the record on the tape 30 may be made in the form of direct current pulses.

It is obvious also that the multiple unit assembly illustrated in Fig. 1 may be provided with a plurality of units 15 such as the one illustrated in Fig. 2 and following. Each of the units 15 is adapted to be placed into its own compartment wherein it is held by the latching means 46, 48, 50. One or more of the units may be driven continuously for reproduction simply by energization of the associated clutch magnet 64. Likewise, each of the units may be operated intermittently for intermittent advance or movement of the tape 30 by engization of the associated advance magnets 58.

While the present invention has been described in connection with the details of a particular embodiment of the invention, it should be understood that these details are not intended to be limitative of the invention except insofar as set forth in the accompanying claims.

Having thus described my invention, what I desire to claim is as follows:

1. Apparatus for feeding a length of medium comprising a frame, a drive capstan mounted on the frame for rotation about a fixed axis, a medium storage means, said storage means including a capstan engaging pinch roller rotatably mounted thereon, means interconnecting said storage means and said frame to pivot said storage means on said frame for movement about a second axis parallel to and spaced from said fixed axis, and means interconnecting said frame and said storage means for urging said storage means toward said drive capstan so that said pinch roller is urged toward said capstan.

2. Apparatus for feeding a length of medium comprising supporting structure, a medium driving capstan assembly rotatably mounted on said structure, a pinch roller for holding the medium against the capstan, a rotatable idler normally disengaged from the capstan assembly and mounted on said structure, a continuously rotatable driving member, and means for moving said idler into engagement with said driving member and said capstan assembly.

3. Apparatus for feeding a length of medium comprising supporting structure, a medium driving assembly including a capstan mounted on said structure for rotation about a fixed axis, a pinch roller for holding the medium against the capstan, a rotatable idler, a rotatable driving member, an idler supporting lever mounted for angular and longitudinal movement about the capstan assembly axis, and means for selectively moving said lever angularly and longitudinally to effect selective engagement of the idler with said capstan assembly and said driving member.

4. Apparatus for feeding a length of medium comprising a medium driving element, means in a force transmitting relation to said element for moving said element step-by-step, means in a force transmitting relation to said element for continuously moving said element, means for operating either of said moving means, and means for preventing operation of more than one of said moving means by said operating means.

5. Apparatus for feeding a length of sensible medium comprising a rotatably mounted medium driving means, ratchet means connected to said driving means to produce intermittent movement thereof in a predetermined direction, a detent engageable with said ratchet means to permit movement in only said predetermined direction, actuating means for transmitting force to said driving means to produce continuous movement thereof, and means controlled by said actuating means for rendering said detent ineffective.

6. Recording apparatus comprising a plurality of recording units each utilizing a sensible medium, means individual to each of said units for driving the medium associated therewith, and means common to more than one of said units for also driving the medium therein.

7. Recording apparatus comprising a plurality of recording units each utilizing a sensible medium, means individual to each of said units for producing intermittent movement of said medium, and means common to more than one of said units for producing continuous movement of said medium.

8. Recording apparatus comprising a plurality of recording units each utilizing a sensible medium, means individual to each of said units for producing movement of said medium, means common to more than one of said units for producing continuous movement of said medium, and means for operating either of said movement producing means to provide a desired type of medium movement in said recording units.

9. A recorder-reproducer utilizing an elongated record medium, including in combination, a capstan-pinch roller medium drive, the capstan including an annular peripheral groove thereabound, and a tape-guiding spring finger mounted at one end in proximity to said capstan and extending into said groove and a short distance beyond the peripheries of said capstan and pinch roller, said finger being arranged to press against the pinch roller.

10. A tape recording apparatus comprising a supporting frame, a plurality of individual supporting plates mounted on said frame, tape driving means mounted on each of said plates, enclosed tape storage means detachably mounted on each of said plates and providing external loops of tape, transducing and pressure pad means mounted on each of said plates and adapted to receive each of said external loops therebetween, actuating means common to all of said driving means, and electrically controlled means for selectively rendering said actuating means effective to operate selected ones of said driving means to move said external loops of tape relative to their associated transducing and pressure pad means.

11. A recorder assembly using a sensible medium comprising a base plate, a medium driving member rotatably mounted on said plate, a ratchet drive mechanism connected to said member, a first solenoid for operating said ratchet drive mechanism to intermittently advance said medium, a wheel connected to said member, a continuously rotating element, an idler pivotally mounted on said plate and movable relative to said wheel and said element, and a second solenoid for moving said idler into concurrent engagement with said element and said wheel to continuously advance said medium.

12. A recorder using a sensible medium comprising a base plate, a capstan mounted on said plate for rotation about a first axis and adapted to engage said medium, a ratchet connected to said capstan, a first solenoid mounted on said plate, pawl means operated by said first solenoid and adapted to engage and operate said ratchet to intermittently advance said medium, a wheel connected to said capstan, a drive element continuously rotating about second axis parallel to and spaced from said first axis, a lever movably mounted on said plate, an idler rotatably mounted on said lever, and a second solenoid carried by said plate for actuating said lever to move said idler into and out of concurrent engagement with said wheel and said drive element for providing continuous advancement of said medium.

13. The recorder set forth in claim 12 including detent means movably mounted on said plate and adapted to engage said ratchet, and means controlled by said second solenoid for preventing engagement of said ratchet by said detent means.

14. A recorder using a sensible medium comprising a base plate, a capstan mounted on said plate for rotation about a first axis, a ratchet connected to said capstan, means including said ratchet for intermittently rotating said capstan, a wheel connected to said capstan, a lever movably mounted on said base, an idler rotatably mounted on said lever, a drive element rotatable about a second axis parallel to and spaced from said first axis, resilient means connected between said lever and said plate for biasing said idler toward engagement with said wheel and said drive element, detent means engaging said lever for holding said idler out of engagement with said drive element and said wheel, and means for moving said detent means away from said lever to permit said resilient means to bias said idler into concurrent driving engagement with said wheel and said drive element so that said capstan is continuously rotated by said drive element.

15. The recorder set forth in claim 14 including means for mounting said lever for sliding and pivoting movement relative to said first axis.

16. The recorder set forth in claim 14 in which said means for moving said detent means includes a solenoid having a pivotally movable armature for controlling movement of said detent means.

17. A recorder using a sensible medium comprising a base plate, a capstan mounted on said plate for rotation about a fixed axis, first means including a ratchet connected to said capstan for moving said capstan step-by-step, second means including a wheel connected to said capstan for continuously rotating said capstan, a magazine for storing said medium, a pinch roller rotatably mounted on said magazine, means pivotably mounting said magazine on said plate with said pinch roller adjacent said capstan, and means carried on said plate for biasing said magazine toward said capstan to resiliently urge said pinch roller toward said capstan.

18. A recorder using an elongated record medium comprising a capstan, a wheel, and a ratchet concentrically arranged and rigidly connected for rotation about a fixed axis, said capstan, said wheel, and said ratchet lying, respectively, within first, second, and third parallel and adjacent planes transverse to said fixed axis; a pinch roller rotatable about a first axis spaced from and parallel to said fixed axis and lying within said first plane, said pinch roller and said capstan being adapted to engage opposite sides of said medium; a drive element rotatable about a second axis parallel to and spaced from said fixed axis; an idler rotatable about a third axis parallel to and spaced from said first and second axes, said idler lying within said second plane and being shiftably into and out of concurrent driving engagement with said wheel and said drive element to continuously rotate said capstan; and means including a pawl disposed in said third plane and movable into engagement with said ratchet for advancing said capstan in a step-by-step manner.

19. A recorder-reproducer apparatus comprising a plurality of separate magnetic recorder units mounted in a spaced relation, each of said recorder units including a first drive mechanism for advancing a length of sensible medium step-by-step and a second drive mechanism for advancing the medium continuously, means in each of said recorder units for operating the first drive mechanism, motor driven means common to and disposed adjacent all of said recorder units, and means in each of said recorder units for rendering said motor driven means effective to actuate said second drive mechanism.

20. The recorder-reproducer apparatus set forth in claim 19 in which each of said magnetic recorder units includes both a pivotally mounted magazine adapted to store said medium and a pinch roller rotatably mounted on the magazine for biasing said medium into engagement with the drive mechanisms.

21. A drive mechanism comprising a capstan; means including a ratchet for driving said capstan; pawl means movable into engagement with said ratchet for actuating said ratchet; means for moving said pawl means; and a stop element disposed adjacent and in the path of movement of said pawl means, said stop element being located relative to said pawl means to engage said pawl means and to force said pawl means inwardly against said ratchet so that, after said pawl means has been moved a predetermined distance, concurrent engagement of said pawl means by said stop element and said ratchet prevents further movement of said pawl means and said ratchet.

(References on following page)

References Cited in the file of this patent

UNITED STATES PATENTS

| | | |
|---|---|---|
| 852,200 | Rein | Apr. 30, 1907 |
| 1,028,505 | Thieme | June 4, 1912 |
| 1,106,929 | Dennis | Aug. 11, 1914 |
| 1,964,031 | Clokey | June 26, 1934 |
| 2,451,365 | Spencer | Oct. 12, 1948 |
| 2,507,385 | Shrader | May 9, 1950 |
| 2,530,961 | Hansen | Nov. 21, 1950 |
| 2,548,981 | Kemp | Apr. 17, 1951 |
| 2,560,234 | Masterson | July 10, 1951 |
| 2,590,665 | Williams | Mar. 25, 1952 |
| 2,644,690 | Krag | July 7, 1953 |
| 2,677,540 | Metzner | May 4, 1954 |
| 2,679,394 | Lear | May 25, 1954 |
| 2,732,144 | Jones | Jan. 24, 1956 |